Aug. 5, 1969  B. W. BRUNSON ET AL  3,459,088
SLITTER MECHANISM

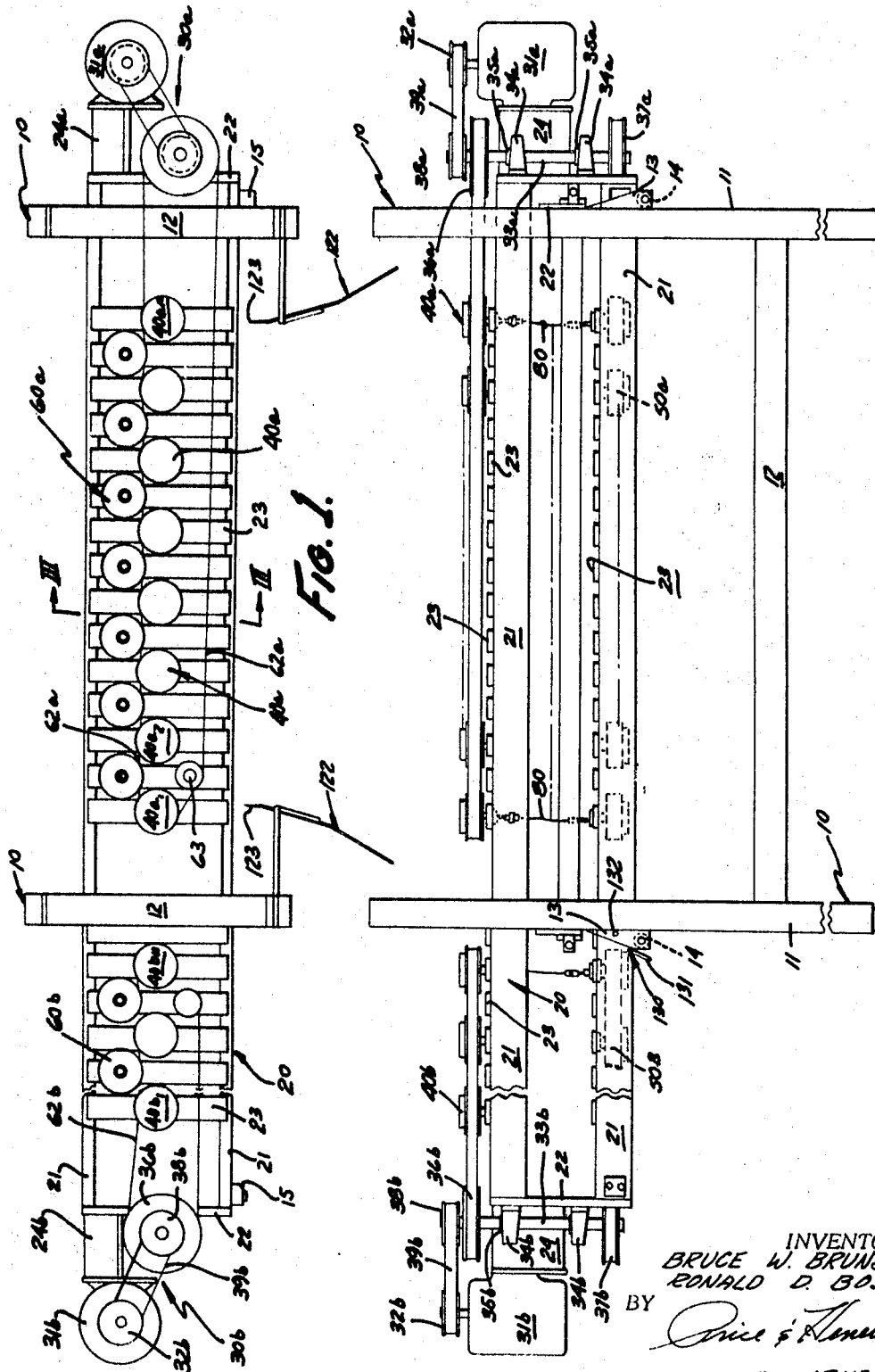

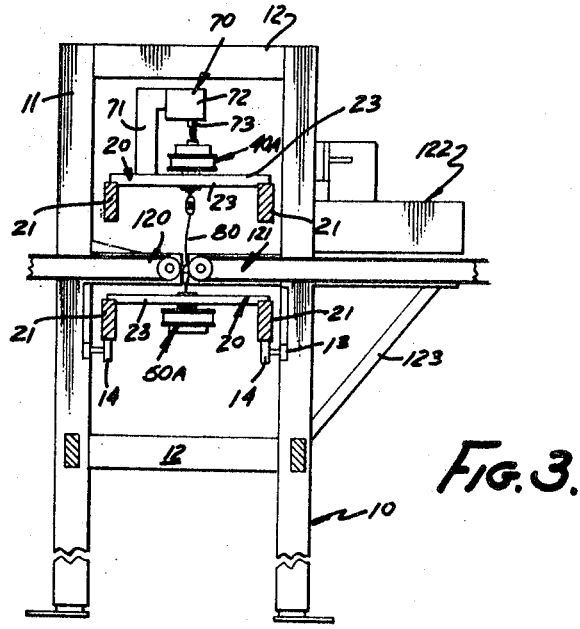
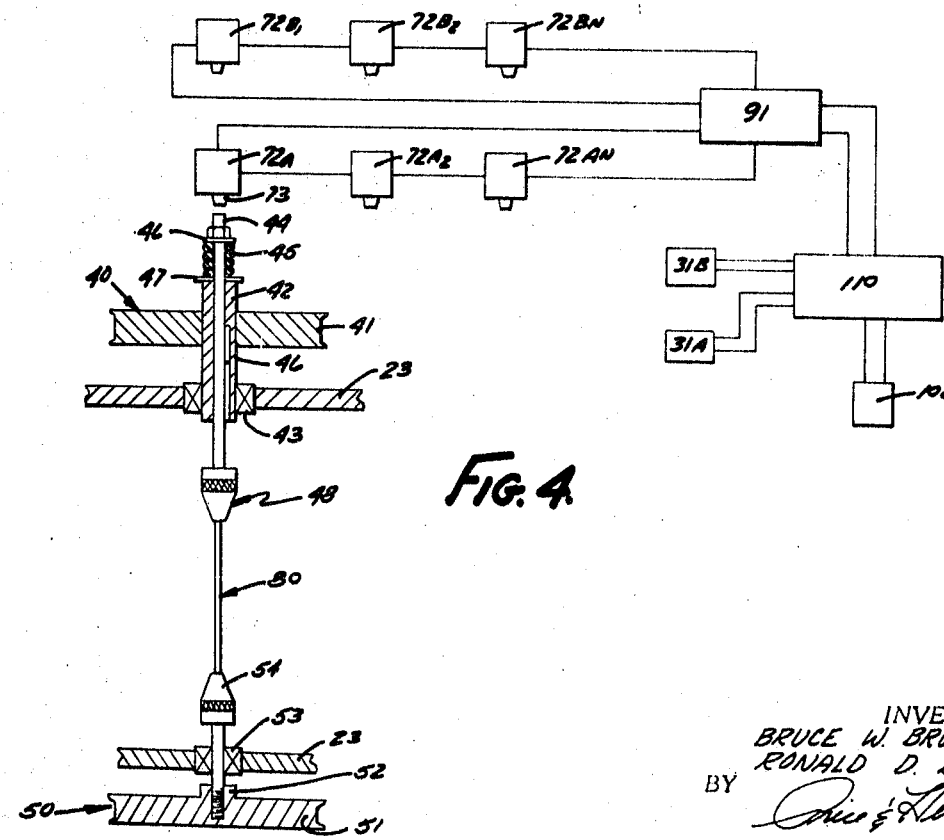

Filed June 6, 1966  3 Sheets-Sheet 3

INVENTORS
BRUCE W. BRUNSON
RONALD D. BOS

BY

ATTORNEYS

United States Patent Office 3,459,088
Patented Aug. 5, 1969

3,459,088
SLITTER MECHANISM
Bruce W. Brunson, Grand Rapids, and Ronald D. Bos, Jenison, Mich., assignors to Werner Machinery Company, Grand Rapids, Mich., a corporation of Michigan
Filed June 6, 1966, Ser. No. 555,568
Int. Cl. B26d 7/28, 5/08
U.S. Cl. 83—522          20 Claims

ABSTRACT OF THE DISCLOSURE

A slitter mechanism for making continuous elongated cuts in baked goods or the like traveling along a conveyor band employing a series of vertically oriented rotating wires as cutting members. The wires are mounted in a carriage which is slidable with respect to the framework of the apparatus. This carriage has a redundant set of cutter mechanisms positioned thereon and this redundant set is moved automatically into operative relationship with respect to the passing goods in the event of a failure of one or more of the cutting members then in active position.

---

This invention relates to slitter mechanisms and, more particularly, to slitter mechanisms particularly adapted for slitting baked goods.

Commercial baking concerns often find it desirable to bake goods in sizes which are so large as to necessitate a slitting operation prior to packaging and distribution. For example, a three layer cake might be manufactured in a continuous strip with a width of five or six feet as indicated in copending application Ser. No. 547,550, filed May 4, 1966 which is assigned to the same assignee as this application. Obviously, these goods must be sectioned prior to packaging and distribution. A number of prior art devices have been built for executing this operation. These devices, however, have not been completely satisfactory for a number of different reasons.

The slitter mechanism must be capable of quickly and cleanly slicing through the goods. The prior art devices utilize one or a plurality of reciprocating blades for the actual cutting operation. These reciprocating blades have a marked tendency to distort the upper and lower surfaces of the goods being cut. This, of course, destroys much of the eye-appealing qualities of the goods and renders them more difficult to market. It additionally raises problems in packaging because of the non-uniform vertical height of the goods.

These types of cutting blades also have a tendency to leave the sides of the goods uneven. This is particularly true when fine textured goods such as cake are being sliced. If the sliced pieces turn out too uneven, they must be discarded, thus detracting from the efficiency of the overall system.

Another problem which the prior art has been unable to solve arises when a malfunction occurs in one of the cutter blades of the slitting device. For example, if a conveyor-type of operation is being utilized, the goods emerge from the oven and cooling tunnel at a prescribed rate of speed. When one of the slitters malfunctions it must be replaced as quickly as possible as there is no mode by which the assembly line production may be brought to a halt. That is to say, if the conveyor belt is turned off the cake then in the oven will be burned. If it is allowed to continue operation, the slitter, depending upon the particular trouble, will either have to be bypassed or replaced.

It is an object of this invention to provide a slitter mechanism which is capable of executing a clean, quick cut regardless of the different type of baked goods passing therethrough.

More particularly, it is an object of this invention to provide a slitter device which will not distort the uniformity of the top and bottom of the goods being sliced and which will leave a uniform edge at the plane of slicing.

It is another object of this invention to provide a slitter mechanism having a redundant slitting section incorporated directly therein whereby, if a malfunction should occur in the primary slitter section, the redundant section may be moved into slitting position immediately.

It is an object of this invention to provide a slitter mechanism wherein by far the most frequent malfunction—i.e. a breaking or distortion of the slitter mechanism per se—will be automatically sensed and an alarm sounded.

It is an object of this invention to provide a slitter mechanism wherein replacement of the primary slitting section by the redundant slitting section will be automatically effected upon the receival of a malfunction signal from the primary slitting mechanism.

It is an object of this invention to provide a slitter mechanism wherein the slitting operation will be continued by the redundant slitting section during the time interval that the primary slitting section is being repaired.

Likewise, it is an object of this invention to provide a slitter mechanism having a primary and redundant slitting section in which the two sections are identical in construction whereby the primary and redundant designations are freely interchangeable dependent upon the particular section which is currently positioned in cutting relationship to the goods.

These and other objects of this invention will be readily understood with reference to the following specification and accompanying figures in which:

FIG. 1 is a broken plan view of the slitter mechanism;

FIG. 2 is a broken side-elevational view of the slitter mechanism;

FIG. 3 is a cross-sectional view taken along line III—III of FIG. 1 and including additionally a schematic representation of the intake and output conveyor belts;

FIG. 4 is a fragmentary, cross-sectional view of one of the slitter devices in combination with a schematic of its associated electronic sensing and replacement circuitry.

Figure 5:
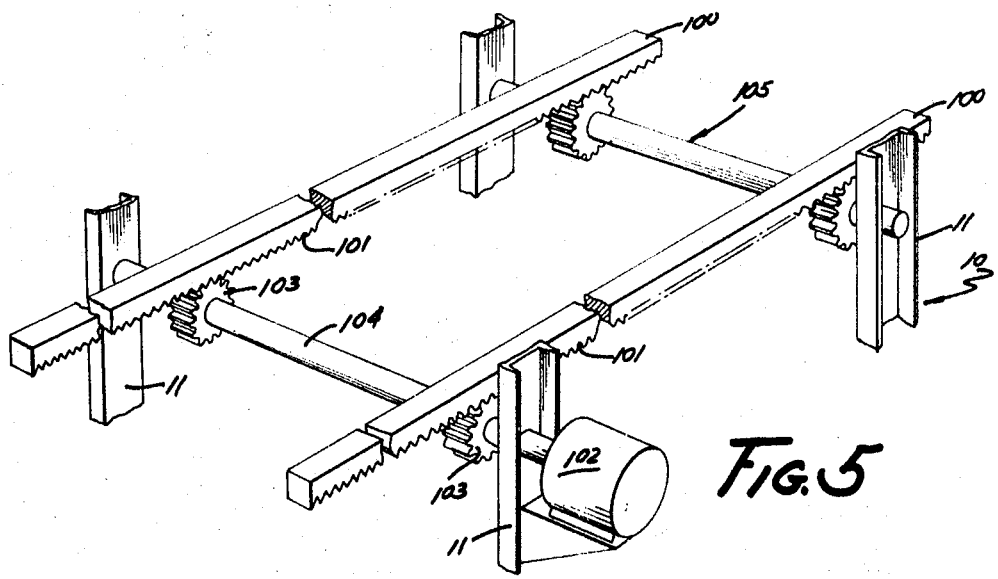
FIG. 5 is a fragmentary perspective view illustrating the manner in which the redundant section of the slitter mechanism may be automatically moved into slicing position.

Briefly, this invention comprises a rotatably mounted elongated wire with which the goods to be sliced are brought into contact. Means are provided for rotating the wire in timed relationship at both its upper and lower extremities such that it does not twist along its longitudinal axis. A plurality of these wires are mounted on a carriage and the carriage is slidably supported by a framework. The wires are rotated on one section of the carriage by one driving means and on the other section of the carriage by a separate and independent driving means. Each of the carriage sections has a sufficient number of rotating wires mounted therein to accommodate the width of the goods to be sliced.

In the event that one of the slitter wires should fracture, means are provided for sensing the fracture and for signaling the employee in charge of the machine. When such a signal is received, the carriage is slid with respect to the framework to move the redundant set of slitters into slicing position and the operation is continued during the time that the primary slitter section is being repaired. If desired, the exchange operation may be executed automatically.

Referring now to the figures, a preferred embodiment of the invention will be discussed in detail. FIGS. 1, 2 and 3 show a framework indicated generally by the reference numeral 10 having four upright supports 11 which are spacially positioned by a plurality of horizontal supports 12. A plurality of roller support plates 13 are affixed to the upright supports 11 and a ball-bearing type roller 14 is mounted on each of them. The four rollers 14 are mounted in a horizontal plane and spaced such that the lower racks 21 of carriage assembly 20 may slide along them.

The carriage assembly 20 comprises four horizontal racks 21 which are spacially supported in rectangular fashion by a pair of end plates 22. The racks 21 are approximately twice as long as the width between upright supports 11. The width between upright supports 11 is determined, of course, by the width of the goods to be sliced and the width of the conveyor assembly carrying them into and away from the slitter mechanism. Mounted in horizontal fashion across the tops of the upper and lower racks 21 are a plurality of rectangular sprocket supports 23 which may be affixed to the racks by any conventional means such as welding. It will be apparent to those skilled in the art that instead of utilizing the individual sprocket supports 23, a continuous plate could be affxed along the top edges of each of the horizontal sets of racks. The method shown, however, is preferable as it aids in the accurate positioning of the various sprocket and cutting assemblies.

It will be noted from the drawings that the carriage assembly 20 may be slid along rollers 14 in such a manner that two different sections of it fill the space within the framework 10 as desired. The movement of the carriage is limited by stops 15. For purposes of explanation, that broken section of the carriage which appears to the left of framework 10 in FIG. 1 will be designated as the redundant section and that section of the carriage which appears within framework 10 in FIG. 1 will be designated as the primary section. The components of the primary section are denoted by the reference letter A and the components of the redundant section are denoted by the reference letter B. The designation of the two sections as primary and redundant is positional in the sense that it is accurate only when the carriage is in the position indicated in FIG. 1. Were the carriage to be slid to the right as far as it will go, that section supporting the components indicated by the reference letter B would become the primary section and that section supporting the components indicated by the reference letter A would become the redundant section. That is to say, that an accurate functional designation of the individual sections as primary and redundant depends upon which particular section is in operating position at the time.

Mounted on each of the end plates 22 is a motor support 24. The drive assemblies 30A and 30B comprise motors 31A and 31B having drive pulleys 32A and 32B affixed to their respective shafts. Indexing shafts 33A and 33B are journalled in conventional bearing assemblies 34A and 34B respectively and vertically positioned by a plurality of collars 35A and 35B. Each of the indexing shafts has an upper drive gear 36 and a lower drive gear 37 affixed to its respective extremities. An index shaft drive pulley 38, which is connected to drive pulley 32 by means of a belt 39, serves as a means for rotating each of the indexing shafts.

A plurality of upper spindle assemblies 40A and 40B are positioned on the spindle supports 23 as indicated in FIG. 1. Referring now to FIG. 4, each of the upper spindle assemblies 40 consist of a drive sprocket 41 which is affixed to a sleeve 42 rotatably journalled within the spindle support 23 by conventional bearing means 43. A central shaft 44 passes through sleeve 42. Shaft 44 is keyed for rotation with sleeve 42 but is vertically slidable with respect thereto. A compression spring 45 bearing against washers 46 on shaft 44 and 47 on sleeve 42 maintains central shaft 44 at its maximum allowable vertical height when no cutting wire is connected thereto. A conventional chuck assembly 48 is affixed to the lower extremity of the shaft 44. As is well known in the art, chuck 48 will clench slitter wire 80 in its jaws as its shell is rotated.

Rotatably mounted in the lower spindle supports 23 below each of the upper spindle assemblies 40 is a lower spindle assembly 50 which comprises a drive sprocket 51 affixed to a shaft 52 which is suitably journalled by bearing 53 within spindle support 23. Another conventional chuck 54, identical to chuck 48 on the upper spindle assembly, is affixed to the upper extremity of shaft 52 in such a manner that chucks 48 and 54 face each other in aligned relationship.

The slidable central shaft 44 in the upper spindle assembly 40 operates in conjunction with compression spring 45 and serves to maintain tension on the slitting wire 80 after it has been inserted in the two chucks 48 and 54. That is to say, that when slitter wire 80 is installed in chucks 48 and 54, chuck 48 is pulled downwardly to compress spring 45 and retain it in that position by the tension on slitter wire 80. While the slitter wires 80 may have any one of a number of cross-sectional configurations, it has been found that steel piano wire having a diameter of 0.018 inch performs satisfactorily.

Offset from and to the side of the rows of upper spindle assemblies 40 and lower spindle assemblies 50 are a plurality of interspaced indexing belt tension sprockets 60 suitably journalled for rotation about their central axes. Conveniently, the tension sprockets 60 may be mounted in individual adjustment slots in spindle supports 23 such that their lateral displacements with respect to the aligned spindle assemblies, and this the force they exert on the indexing belt at any particular point, may be adjusted.

Four separate indexing belts 62 are utilized in the slicer as shown. One of the indexing belts 62A passes around upper drive gear 36A, around the lateral extension of the upper spindle assemblies 40A, and closes on itself via idler pulley 63. Conveniently, idler pulley 63 also may be mounted in an adjustment slot to facilitate installation and removal of the indexing belt. As will be seen from FIG. 1, the indexing belt tension sprockets 60 which are positioned such that their working peripheries extend over a straight line connecting the belt contacting sections of the upper spindle assemblies, serve to seat the indexing belt 62A firmly onto each of the spindle assemblies 40A. As is well-known in the art of timing gears and belts, each of the indexing belts has a plurality of equally spaced ridges on its inner periphery which contact mating slots in the peripheries of the sprockets 41 of the spindle assemblies 40 to insure that all of the spindle assemblies will be retained in fixed peripheral relationship to the timing belt. Drive sprockets 36A is similarly grooved for an identical purpose.

Each of the remaining three indexing belts 62 are installed and operate in an identical manner. Thus when motor 31A is activated, upper indexing belt 62A travels in endless fashion and rotates each of the upper spindle assemblies 40A at a prescribed rate of speed. Since upper drive sprocket 36A is positively connected to lower drive sprocket 37A, lower indexing belt 62A travels in an endless fashion about lower spindle assembly 50A, causing the lower spindles to rotate at exactly the same speed as the upper spindles are rotating. The timed rotational relationship of the upper and lower spindle assemblies in each section of the mechanism is extremely important as any differential speed will cause the slitter wires to twist and fracture. Similarly, as motor 31B is activated, upper drive sprocket 36B and lower drive sprocket 37B drive upper spindle assemblies 40B and lower spindle assemblies 50B at precisely the same rotational speed, thus preventing twisting of the redundant set of slitter wires.

Positioned above each of the upper spindle assemblies is a tension sensor assembly 70 (see FIGS. 3 and 4) consisting of an inverted L-shaped support bracket 71 having a microswitch 72 affixed thereto in such a manner that its contact button 73 lies in aligned relationship with central shaft 44 of the upper spindle assembly 40. In the event that one of the slitter wires 80 should separate during operation of a particular section of the slitter mechanism, the central shaft 44 associated therewith will move upwards under the influence of compression spring 45 to contact and activate button 73 on the adjacent microswitch. Assuming the microswitches to be of the type which are closed when their contact buttons 73 are extended, all of the microswitches associated with one section of the machine may be wired in series with the alarm system which will alert the operator when an opening appears across the circuit. Thus microswitches $72A_1, 72A_2 \ldots 72A_n$ are associated with spindle assemblies $40A_1, 40A_2 \ldots 40A_n$ respectively and when the slitter wire rotated by any particular one of these spindle assemblies fractures, the alarm 91 will be sounded to alert the operator.

An identical sensor assembly 70B is provided for the redundant section of the machine. Thus microswitches $72B_1, 72B_2 \ldots 72B_n$ are associated respectively with upper spindle assemblies $40B_1, 40B_2 \ldots 40B_n$ and may conveniently feed into this same alarm system 91.

Assuming that the A or primary system is in operation, when the alarm system sounds indicating a fracture of one of the slitter wires associated therewith, the operator merely pushes carriage 20 to the right as viewed in FIG. 1 until such time as the stop 15 on the extreme left hand side of the carriage comes into contact with framework 10. In this position an independently operative set of slitter wires is in position to continue the slitting operation while the primary section is being repaired. Since the primary and redundant sections are identical in nature, the redundant section may be left in operative position until such time as a malfunction occurs in one of its components. The alarm 91 will then sound again and the repaired A section may be moved back into operative position while the B section is repaired. Of course, it is necessary that the drive motors 31A and 31B be started prior to moving their associated slitting sections into operative position.

The provision of redundant section B of the slitting mechanism minimizes the waste occurring during a breakdown of the slitter assembly. The alarm system 91 will sound the moment a fracture of one of the slitter wires occurs and waste continues only during the interval required for the operator to move the redundant section of the slitter mechanism into operative position.

The immediate replacement aspects of this mechanism may be completely automated by providing a rack gear surface on the lower edges of the two lower racks 21 as indicated by the reference numeral 100 in FIG. 5. Each of the geared racks 100 has a gear surface 101 along its bottom. A reversible motor 102 which is suitably affixed to the framework 10 of the machine moves the geared racks 100 backward and forward by means of a pair of pinion gears 103 and a slave shaft 104. An idler pinion arrangement 105 may be provided on the other end of the machine.

The utilization of the automatic replacement apparatus shown in FIG. 5 requires the addition of a logic circuit 110 (see FIG. 4) to the slitter mechanism. These circuits are well known in the art of mechanism control and it is not deemed necessary to discuss the components in detail. Suffice it to say that logic circuit 110 may be fabricated and interconnected with the remainder of the system in such a manner that when it receives a signal from microswitches $72A_1, 72A_2 \ldots 72A_n$ that a malfunction has occurred in the primary section of the mechanism it will immediately activate motors 31B and 102 in such a manner that the redundant section of the slitter mechanism will be moved into operative position. At some later time, when a signal is received from microswitches $72B_1, 72B_2 \ldots 72B_n$ that a malfunction has occurred in the redundant or B part of the system, the logic section will be operative to activate motors 31A and 102 in such a manner that the primary or A section of the slitter mechanism will be moved into operative position. As shown, motor 102 is reversible but it will be understood by those skilled in the art that a transmission and clutching arrangement could be utilized to achieve the necessary reciprocating capability.

Referring again to FIG. 3, it will be noted that when it is desired to place the slitter mechanism, which is the subject of this invention, in operative position on a baking assembly line, an input conveyor 120, which may emerge from the cooling tunnel, is placed in nearly abutting relationship with the lateral line of slitter mechanisms within framework 10. An output conveyor 121, which may proceed towards a cross slicer, is brought into nearly abutting relationship with the other side of the latterly aligned slitter wires within framework 10. Edge scrap removal assembly 122 is positioned on conveyor 121 such that the feathered edge scraps on the goods will be removed from the conveyor by being shunted to suitable containers which may be positioned on the floor. This is accomplished by positioning the leading edges 123 immediately behind and in line with the outside wires.

As the edge of the baked goods to be sliced passes off of the conveyor 120 it is contacted by the rotating slitted wires 80 which are operative to cleanly and uniformly slice it into sections, the width of which depends upon the width between slitter wires 80. As the baked goods are slit, the slit section thereof passes on conveyor belt 121 on which they are carried to the cross slicer. Assuming the primary or A section of the slitter mechanism to be in operative position with respect to the conveyor assemblies 120 and 121, if one of the slitter wires 80A should fracture its associated microswitch 70A will open and the alarm will be sounded. The attendant may reinitiate action of the slitter mechanism by merely pushing carriage 20 to the right as viewed in FIG. 1 until such point as the stops 15 on the extreme left end of the carriage contact frame 10 and the slitting process may be continued while the primary section of the slitter mechanism is repaired.

It should be noted that in order to attain uniform sections of the goods being slit, it is necessary to positively position carriage 20 with respect to framework 10. A number of well known means are available in the art for performing this function. Thus, a cam follower or a system of mating notches and axles might be utilized. As shown in FIG. 2, the locking assembly 130 comprises a pin 131 which is inserted through mating apertures 132 in framework 10 and carriage rack 21. A sufficient number of such locking mechanisms may be utilized to insure positive lateral positioning of the carriage with respect to the framework in both its primary and redundant position.

At some later time, should a malfunction signal be received from one of the microswitches of the redundant section, the alarm will be sounded and the repaired primary section may be slid back into operative position. Alternatively, the rack and pinion assembly shown in FIG. 5 and the logic section shown in FIG. 4 may be utilized to automatically perform this interchange.

Thus it will be seen that this invention will provide a slitter mechanism which is capable of performing any desired number of uniform slicing operations on the goods traveling along a conveyor line and which, when a malfunction occurs, is capable of immediate replacement. While a preferred embodiment of this invention has been illustrated in detail, along with a minor modification thereof, it will be apparent to those skilled in the art that many other modifications are possible without departing from the spirit and scope of this invention.

I claim:
1. A slicer for goods comprising:
a frame;
an elongated wire;
drive means mounted on said frame for rotating said wire, said drive means including a rotating assembly positioned at and affixed to each extremity of said wire;
means for rotating each of said assemblies and said wire at identical speeds in identical directions to prevent twisting of said wire; and
means for causing relative movement between said wire and said goods in order to place said goods in slicing relationship with said wire.

2. The slicer as set forth in claim 1 which further comprises means positioned at one of said rotating assemblies for maintaining said wire in tension.

3. The slicer as set forth in claim 1 wherein there are a series of elongated wires, each such wire having one of said drive means mounted on the frame for rotating it, each said drive means including a rotating assembly positioned at and affixed to each extremity of the wire; and means for rotating each of said wires, said means for rotating each of said wires including means for rotating each extremity of a single wire at identical speeds.

4. The combination as set forth in claim 2 wherein said drive means comprises:
a drive sprocket positioned above and below said wire and rotatably journalled in said frame; and
a jaw affixed to the facing surfaces of each of said drive sprockets, said jaws being adapted to grip said wire.

5. The combination as set forth in claim 4 wherein said maintaining means comprises:
a shaft mounted for rotation with but axially slidable with respect to one of said drive sprockets, one of said jaws being affixed to the end of said shaft between said drive sprockets; and
spring means axially biasing said shaft outwardly so as to tend to increase the distance between said jaws.

6. The combination as set forth in claim 5 wherein the end of said shaft remote from the jaw extends through its associated drive sprocket and which further comprises a microswitch affixed to said frame having its contact adapted to be engaged by said end when said spring means biases said end shaft to a predetermined position.

7. An apparatus comprising:
a framework;
an elongated carriage;
a first series of operative components mounted on one section of said carriage;
a redundant series of identical operative components mounted on a redundant section of said carriage; and
means mounting said carriage for slideable movement with respect to said framework whereby when a malfunction occurs in said first series of said one section said redundant section, and its said redundant series, may be slid into the spatial position formerly occupied by said one section.

8. The apparatus as set forth in claim 7 which further comprises electrical sensing means for sensing the malfunction in said first series.

9. The apparatus as set forth in claim 8 which further comprises electromechanical means connected with said sensing means for automatically interchanging said sections upon a signal from said sensing means.

10. A slicer for goods comprising:
a framework;
a carriage supported by said framework;
a plurality of first elongated members rotatably mounted within said carriage; and
a rotating assembly positioned at and affixed to each extremity of each of said first members and means for rotating each of the assemblies affixed to a single one of said first members at identical speeds.

11. The combination as set forth in claim 10 in which said rotating assemblies comprises:
a plurality of drive sprockets journalled within said carriage, each of said first members being affixed at each of their extremities to one of said drive sprockets.

12. The combination as set forth in claim 11 wherein half of said drive sprockets are journalled in the upper section of said framework and half are journalled in the lower section of said framework, one each of said upper and lower drive sprockets being generally axially aligned and associated with one of said cutting members.

13. The combination as set forth in claim 12 wherein said rotating means comprises:
notched belt engaging peripheries on each of said upper and lower drive sprockets;
upper and lower notched drive belts engaging a section of the notched periphery of each of said upper and lower drive sprockets respectively; and
means for rotating said upper and lower drive belts at identical speeds.

14. The combination as set forth in claim 13 wherein the means for rotating said belts comprises:
a drive shaft having notched drive gears affixed to each extremity thereof, said shaft being journalled on said framework such that one of said drive gears engages said upper drive belt and the other of said drive gears engages said lower drive belt; and
means for rotating said shaft.

15. The combination as set forth in claim 13 which further comprises:
a plurality of idler rollers journalled on the upper and lower sections of said framework, a section of the periphery of said idler rollers extending into the space between adjacent upper and lower drive sprockets whereby said drive belts are urged into positive engagement with said drive sprockets.

16. The combination as set forth in claim 11 which further comprises:
tension means positioned at one of the drive sprockets of each said two drive sprockets for maintaining a tension stress on each of said first members.

17. The combination as set forth in claim 16 which further comprises:
sensing means for sensing when one of said tension means becomes inactive; and
alarm means operatively connected to said sensing means.

18. The combination as set forth in claim 17 wherein said sensing means comprises:
a plurality of switches affixed to said framework, each of said switches being positioned in operative relationship with one of said elongated members so as to have its contact engaged by said tension means when said elongated member is in a predetermined condition.

19. The combination as set forth in claim 16 which further comprises:
a plurality of second elongated members rotatably mounted within a different section of said carriage from said first members;
means for rotating said second members; and
means slideably supporting said carriage with respect to said framework whereby said plurality of second members may be slid into the spatial position formerly occupied by said plurality of first members.

20. The combination as set forth in claim 19 which further comprises:
sensing means positioned in operative relationship with each of said first and second members for determining when one of said first or second members fractures; and
electromechanical means for moving said carriage with respect to said framework in response to a signal from one of said sensing means whereby said second members are moved into operative position when a fracture is sensed in one of said first members and said first members are moved into operative position when a fracture is sensed in one of said second members.

References Cited

UNITED STATES PATENTS

| | | | |
|---|---|---|---|
| 1,959,424 | 5/1934 | Hawkins | 83—479 X |
| 2,316,171 | 4/1943 | Kottmann et al. | 83—62 |
| 2,692,328 | 10/1954 | Jaye | 25—112 X |
| 3,064,589 | 11/1962 | Genich | 31—22 X |

ANDREW R. JUHASZ, Primary Examiner

U.S. Cl. X.R.

31—23; 83—425, 433, 563